United States Patent [19]

Queiser et al.

[11] 4,314,877

[45] Feb. 9, 1982

[54] METHOD AND APPARATUS FOR DRYING RADIOACTIVE WASTE WATER CONCENTRATES FROM EVAPORATORS

[75] Inventors: Horst Queiser, Maintal; Othmar Meichsner, Raunheim; Dietmark Erbse, Rodenbach, all of Fed. Rep. of Germany

[73] Assignee: Kraftwerk Union Aktiengesellschaft, Mülheim, Fed. Rep. of Germany

[21] Appl. No.: 201,561

[22] Filed: Oct. 28, 1980

[30] Foreign Application Priority Data

Nov. 2, 1979 [DE] Fed. Rep. of Germany ....... 2944302

[51] Int. Cl.[3] ............................................ B01D 1/24

[52] U.S. Cl. ............................ 159/47 WL; 159/11 R; 159/DIG. 12; 159/49; 252/632

[58] Field of Search .............................. 252/632, 631; 159/DIG. 12, 11 R, 10, 47 WL, 49, 1 C, 25 R, 25 A; 34/113, 114, 119, 122; 137/565, 566

[56] References Cited

U.S. PATENT DOCUMENTS

| | | | |
|---|---|---|---|
| 789,984 | 5/1905 | Mackland | 159/11 |
| 4,119,560 | 10/1978 | Sheeline | 159/DIG. 12 |

FOREIGN PATENT DOCUMENTS

| | | | |
|---|---|---|---|
| 2012785 | 10/1971 | Fed. Rep. of Germany | 252/632 |
| 2822388 | 7/1978 | Fed. Rep. of Germany | 252/632 |

*Primary Examiner*—Norman Yudkoff

*Attorney, Agent, or Firm*—Herbert L. Lerner; Laurence A. Greenberg

[57] ABSTRACT

Drying radioactive waste water concentrates from evaporators to produce a dried product of low residual moisture by (a) preheating a waste water concentrate with a solids content of at most 20% by weight to a temperature of 50°-70° C., (b) passing the preheated concentrate with a solids content of at most 20% by weight into a two-cylinder drier at the rate of 10 to 20 liters per square meter of usable cylinder surface per hour, (c) maintaining the cylinder temperature between about 160° to 210° C., (d) retaining the concentrate in the drier for a residence time of 7 to 18 seconds on the cylinder to produce a dried product of low residual moisture on the cylinder surface, and (e) discharging the dried product of low residual moisture from the cylinder surface.

20 Claims, 1 Drawing Figure

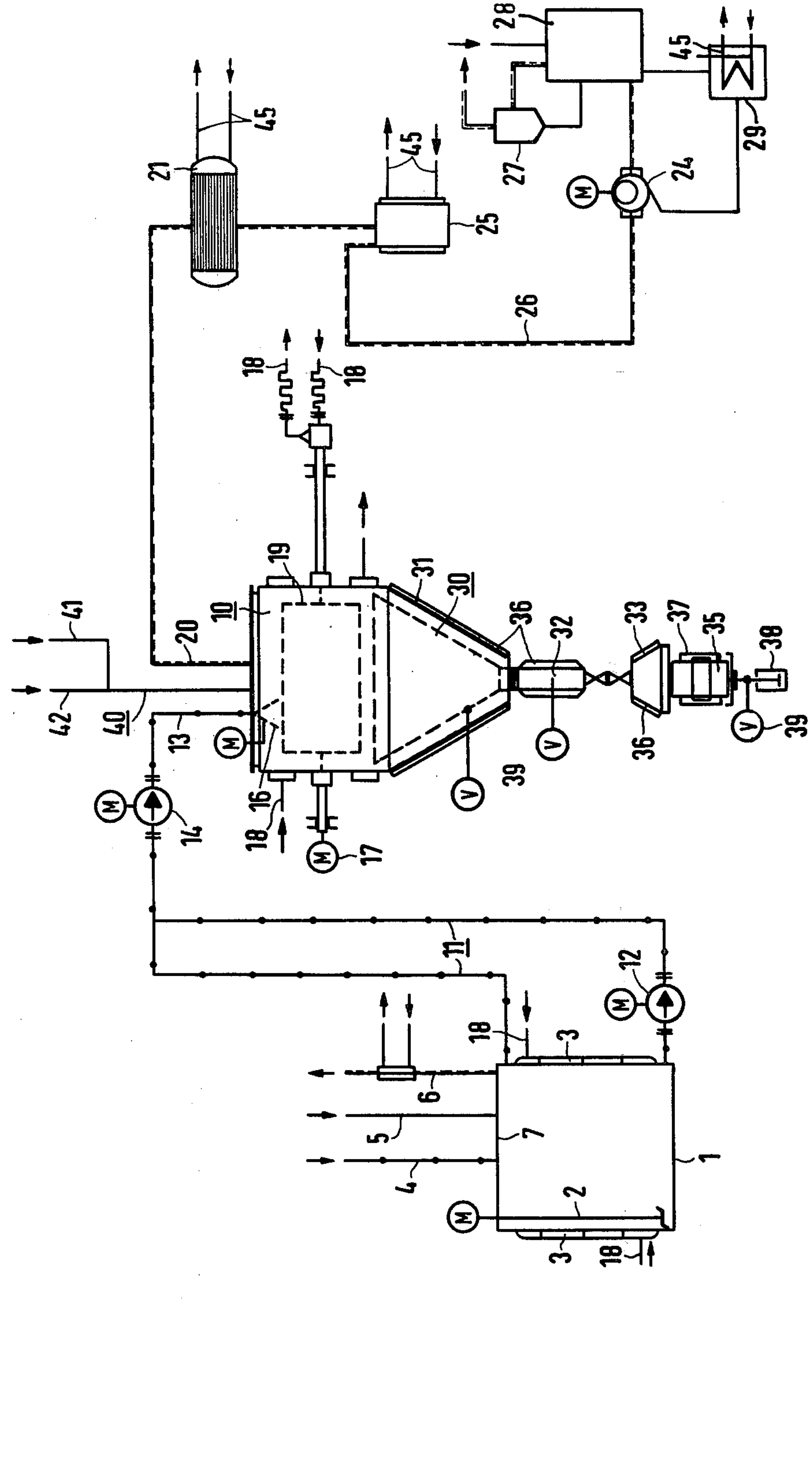
1
2
3
4
5
6
7
10
11
12
13
14
16
17
18
19
20
21
24
25
26
27
28
29
30
31
32
33
35
36
37
38
39
40
41
42
45
M
V

METHOD AND APPARATUS FOR DRYING RADIOACTIVE WASTE WATER CONCENTRATES FROM EVAPORATORS

BACKGROUND OF THE INVENTION

1. Field of the Invention

The invention relates to a method and apparatus for drying radioactive waste water concentrates from evaporators with a two-cylinder dryer.

2. Description of the Prior Art

In nuclear installations, radioactively contaminated waste waters are purified in decontamination evaporators. There, the impurities with the radioactive components are enriched in the so-called concentrate, which is solidified for ultimate storage by a binder. Prior to the solidification it is often advantageous to remove the water content of the concentrate by drying in order to reduce the waste volume and to ensure certain produce properties. In order to make this drying possible at all, it is necessary to solve the problems which can arise from the different composition of the concentrates, for instance, of chloride-, sodium sulfate- and washing agent-containing concentrates of boiling water reactors and of concentrates with boron salts, as are produced particularly in the coolant purification of pressurized water reactors.

SUMMARY OF THE INVENTION

An object of the invention is to provide a drying process which is equally well suited for the different concentrates and which results in dried products advantageous for interim storage and later disposition.

With the foregoing and other objects in view, there is provided in accordance with the invention a method for drying radioactive waste water concentrates from evaporators which comprises (a) preheating a waste water concentrate with a solids content of at most 20% by weight to a temperature of 50°-70° C., (b) passing the preheated concentrate with a solids content of at most 20% by weight into a two-cylinder dryer at the rate of 10 to 20 liters per square meter of usable cylinder surface per hour, (c) maintaining the cylinder temperature between about 160° to 210° C., (d) retaining the concentrate in the dryer for a residence time of 7 to 18 seconds on the cylinder to produce a dried product of low residual moisture on the cylinder surface, and (e) discharging the dried product of low residual moisture from the cylinder surface.

In accordance with the invention, there is provided an apparatus for drying radioactive waste water concentrates from evaporators comprising (a) a feed tank equipped with a stirrer and with a jacket for the passage of a heating medium to heat the tank, (b) an inlet opening in the tank for the introduction of waste water concentrates from evaporators, (c) a discharge opening near the bottom of the tank and a return opening near the top of the tank together with connecting conduits and an interposed pump to form a circulatory loop for circulating waste water concentrate from and to the tank, (d) a bleeder line having one end connected to the circulatory loop for bleeding waste water concentrate, and having a line length shorter than the loop, (e) a pump connected to the bleeder line to regulate the flow of concentrate therethrough, and (f) said bleeder line having its other end connected to a two-cylinder dryer with a scraper associated with the cylinders to remove dry material from the cylinders.

Other features which are considered as characteristic for the invention are set forth in the appended claims.

Although the invention is illustrated and described herein as embodied in a method and apparatus for drying radioactive water concentrates from evaporators, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates apparatus for carrying out the method of the invention in which waste water concentrate is preheated in a feed tank and if required the pH adjusted. The concentrate circulates in a loop from which controlled amounts are bled and fed to a two-cylinder dryer. The temperature and rate of rotation of the cylinders are controlled. Reduced pressure is maintained in the dryer by means of a pump connected to a vapor line.

DETAILED DESCRIPTION OF THE INVENTION

In accordance with the invention, the concentrate is preheated to 60° C. and prior to drying it has a solids content of at most 20%. This preheated concentrate is fed to the dryer in a quantity of 10 to 20 l per $m^2$ useful cylinder surface per hour for dwelling times of 7 to 18 sec. at cylinder temperatures between 160° to 210° C. The dry product produced by the method according to the invention has low residual moisture of only 1 to 5% and therefore, excellent properties with respect to further processing. It can easily be taken off the cylinders and then worked with known embedding materials such as cement, bitumen, or plastic with which it is preferably filled into the customary 200-l barrels and shipped for ultimate storage. However, it is also well suited for interim storage without binder because it is only slightly hydroscopic. This means that the end product can be stored as a dry powder under the exclusion of air for extended periods of time until it can be removed according to the most recent ultimate storage requirements, possibly together with other residues in powder form in economically advantageous quantities and advantageously with respect, for instance, to permissible activity, above-mentioned binders, etc.

The low residual moisture, which is decisive for the storability and has heretofore been neglected in this respect, can be achieved due to the preheating, the pH-value and the underpressure at very specific cylinder temperatures which depend on the composition of the concentrate. For boiling-water reactor evaporator concentrates and for pressurized-water reactor evaporator concentrates with organic components, a temperature of about 160° applies, and for pressurized-water reactor evaporator concentrates, a temperature of 180° to 210° C. It was ascertained that at such high temperatures (above 180° C.), in conjunction with pH-values of 3 to 8, boron salts with little crystal water content are produced which are far less hygroscopis than in other drying processes. The sodium metaborate content of the concentrate must be set to at most 10% by weight, especially by the addition of calcium chloride, because then the crystal form desired for the dry product is obtained with certainty.

Extensive investigations with a two-cylinder dryer for determining the operating parameters for the different types of concentrate to be powderized showed, on the basis of tests with other types of dryers, that, to obtain a dry product at all and particularly one with especially low hygroscopic properties, the parameters batch size, layer thickness on the cylinder, dwelling or residence time on the cylinder, usable cylinder surface, dry-component content of the concentrate, the temperature of the cylinders and of the concentrate, and the pressure in the cylinder dryer are important. The parameters should fulfill, speaking generally, the following relation:

$$\frac{Q \cdot t_v}{F_N \cdot s} \cdot \frac{t_W}{t_M} \cdot p \cdot C_M = 15 \text{ to } 635 \cdot 10^{-5}$$

where $t_m$ = concentrate temperature (°C.)
p = residual moisture of the product (%)
$C_M$ = content of dry material in the concentrate (%)
Q = charging quantity ($m^3/h$)
$t_v$ = dwelling time (h)
$F_N$ = usable cylinder surface ($m^2$)
s = layer thickness (m)
$t_W$ = cylinder temperature (°C.)

It is advantageous to set the pH-value to 3 to 8, depending on the concentrate composition, and an underpressure, i.e. subatmospheric or reduced pressure of 0.1 to 0.8 bar. The dwelling or residence time which determines the amount of heat supplied, is obtained for commercially available cylinder dryers at cylinder speeds of 2 to 5 rpm. The content of dry material (solids, dry basis) in the concentrate is preferably 15% by weight. However, the content of filterable solids should be at most 5% by weight. These limits can be maintained by admixing, for instance, filter concentrates or sedimentation with elutrition.

Important for the proper operation of a concentrate drying plant is an interconnection of equipment suitable for the processing and the preparation of the concentrates for drying as well as post-processing of the substances separated by the drying (powder, steam and other volatile substances). The corresponding equipment interconnection is shown in the attached drawing which will be explained in the following.

Feed tank 1, is equipped with a stirring mechanism 2 and surrounded by a heating jacket 3 for the introduction of a medium, for instance, steam. The evaporator concentrate 4 to be dried, which comes from a decontamination evaporator for the drying process, with about 15% by weight solids content, not shown, is prepared i.e. preheated to 60° C. and mixed; the content of filterable solids being set to maximally 5% by weight. A line 5 for introduction of chemicals for setting the mixture with respect to the pH-value, is provided leading to the topside 7 of the tank. Undesired gases and vapors are also released from feed tank 1 through line 6 which also connects to topside 7 of tank 1.

Between the feed tank 1 and a two-cylinder dryer 10, is arranged a loop 11 in which 4- to 8-times the amount of the dryer output is circulated by means of a sludge pump 12.

From the loop 11, the amount intended for drying of, for instance, 50 l/h, is fed over the shortest path by means of a spur or bleed line 13, by a volumetrically dosing and controllable eccentric worm pump 14 into the two-cylinder dryer 10 via a motor-driven oscillating tube 16, in such a manner that it is uniformly distributed over cylinders 19. Cylinders 19 are driven by a motor 17 and are heated, for instance, to 200° C. (160° to 210°), via a steam line 18. The dryer housing is likewise heated by passing steam through a heating jacket. The oscillating tube 16 which is connected to line 13 via a flexible hose, oscillates with end of tube 16 facing the cylinders 19 between 2 and 20 cm above the cylinders. With a rated dryer performance of, for instance, 50 l/h, the usable cylinder surface is 3.2 $m^2$. The dwelling time is adjusted by speed control to, for instance, 10 seconds.

The dry product is taken off by scrapers which are associated with the cylinders 19 in known manner. However, contrary to the manual readjustment customary heretofore, the scrapers are pressed-on and readjusted pneumatically.

Also the eccentric worm pump 14 provided deviates from the design used heretofore in that the stator, as a part subject to wear, can be readjusted by remote control. Through these two measures, the radiation exposure of the operating personnel is kept as low as possible.

The water content of the concentrate evaporated in the dryer 10 is drawn off through a suction or vapor outlet line 20 and condensed in a vapor condenser 21. Then the condensate is conducted into a special washing tank 25.

Air, which has broken into the reduced pressure system and is loaded with aerosols, is cleaned in this washing tank 25, the condensate cooled there being used as the washing liquid. Excess condensate is further processed in a waste water processing plant, not shown.

A water ring pump 24 is used to maintain the reduced pressure. Pump 24 is connected to the washing tank 25 via line 26; the auxiliary pump medium, water, serves in the ring water tank 28 as a further washing stage. An additional droplet separator 27 to remove entrained drops is used after the ring water tank 28. The temperature of the auxiliary pump medium is held constant by the ring water cooler 29. All cooling and cold-water lines are designated with 45.

The discharge device 30 with the discharge funnel 31, the filling line 32 and the hood 33, as well as the dried-product tank 35 are heated to prevent steam condensation with possibly renewed water absorption of the powder product discharged from the dryer 10, which is produced on the cylinders with a layer thickness of, for instance, 0.5 mm (0.3 to 0.5 mm) and has a residual moisture of only 1 to at most 5%. The same heating medium, steam, for the heater 36 of the discharge device 30, is used as for the dryer 10, while contactless infrared heating 37 is preferably used for heating the dry-product tank 35. In order to prevent deposits in the dry-product discharge, the discharge funnel 31 and the filling line 32 are provided with a suitable known vibrator device 39. The vibrator device may be operated electrically, electromagnetically, or pneumatically. The associated lifting station 38 for filling it is likewise provided with the vibrator device 39 for a better degree of filling of the dried-product tank 35.

Also associated with the drier 10 is a flooding and cleaning device 40, which consists of a flushing-water line 41 with a connection 42 for feeding-in chemicals, cleaning agents etc. and a transportable rinsing barrel with rinsing pump which can pump the rinsing water in circulation through the dryer 10. Thereby, the dryer can be decontaminated on the inside, for instance, prior to inspection work, in-service tests, etc., in order to keep the radiation exposure for the personnel as low as possible.

To minimize corrosion damage which could be corrected likewise only by personnel, which is undesirable because of the radiation exposure, at least the cylinders 19 and the surfaces of the cylinder drier 10 exposed to the vapors as well as the vapor lines 20 and 26 are made in the embodiment example of corrosion-resistant steel 1.4439 as per DIN 17007. It may also be advantageous to construct still other parts of the apparatus according to the invention with corrosion-resistant surfaces.

In the embodiment example the above-mentioned relation of the drying parameters is obtained which yielded in tests excellent results with respect to the processability and storability of the dry products, namely, values in the range of 40 to $200\times\mathbf{10}^{-5}$.

There are claimed:

1. Method for drying radioactive waste water concentrates from evaporators which comprises
(a) preheating a waste water concentrate with a solids content of at most 20% by weight to a temperature of 50°-70° C.,
(b) passing the preheated concentrate with a solids content of at most 20% by weight into a two-cylinder drier at the rate of 10 to 20 liters per square meter of usable cylinder surface per hour,
(c) maintaining the cylinder temperature between about 160° to 210° C.,
(d) retaining the concentrate in the drier for a residence time of 7 to 18 seconds on the cylinder to produce a dried product of low residual moisture on the cylinder surface, and
(e) discharging the dried product of low residual moisture from the cylinder surface.

2. Method according to claim 1, wherein the preheated concentrate passed into the drier has a content of filterable solids of at most 5% by weight.

3. Method according to claim 1, wherein the drying takes place under reduced pressure of 0.8 to 0.1 bar.

4. Method according to claim 1, wherein the waste water concentrate prior to drying is adjusted to a pH-value of 3 to 8.

5. Method according to claim 1, wherein the waste water concentrate contains boron salts and wherein the cylinder temperature is between 180° to 210° C.

6. Method according to claim 5, wherein the concentrate is adjusted to a sodium metaborate content of at most 10% by weight.

7. Method according to claim 6, wherein the sodium metaborate content is adjusted by adding calcium chloride.

8. Method according to claim 4, wherein the waste water concentrate contains boron salts and wherein the cylinder temperature is between 180° and 210°0 C.

9. Method according to claim 8, wherein the concentrate is adjusted to a sodium metaborate content of at most 10% by weight.

10. Method according to claim 9, wherein the sodium metaborate content is adjusted by adding calcium chloride.

11. Apparatus for drying radioactive waste water concentrates from evaporators comprising
(a) a feed tank equipped with a stirrer and with a jacket for the passage of a heating medium to heat the tank,
(b) an inlet opening in the tank for the introduction of waste water concentrates from evaporators,
(c) a discharge opening near the bottom of the tank and a return opening near the top of the tank together with connecting conducts and an interposed pump to form a circulatory loop for circulating waste water concentrates from and to the tank,
(d) a bleeder line having one end connected to the circulatory loop for bleeding waste water concentrates, and having a line length shorter than the loop,
(e) a pump connected to the bleeder line to regulate the flow of concentrates therethrough,
(f) said bleeder line having its other end connected to a two-cylinder drier with a scraper associated with the cylinders to remove dry material from the cylinders.

12. Apparatus according to claim 11, wherein said pump connected to the bleeder line is a readjustable eccentric worm pump, which feeds into an oscillating tube which can be moved in the longitudinal direction of the cylinders.

13. Apparatus according to claim 12, wherein the oscillating tube is connected to the bleeder line by means of a flexible hose and the end of the oscillating tube facing the cylinders ends 1 to 20 cm above the cylinders.

14. Apparatus according to claim 13, wherein said scrapers associated with the cylinders are pressed-on and readjusted by means of a compressed-air cylinder.

15. Apparatus according to claim 14, wherein beneath said scraper into which the dry material sequentially passes are a discharge funnel, a filling line, a hood and lifting station for tanks for receiving the dry material, which are provided with heating devices.

16. Apparatus according to claim 15, wherein the discharge funnel, the filling line and the lifting station are each equipped with a vibration device.

17. Apparatus according to claim 11, wherein said two-cylinder drier is connected to a vapor outlet line which is connected to a washing tank.

18. Apparatus according to claim 17, wherein a pump for maintaining reduced pressure in the two-cylinder drier is interposed in said vapor outlet line following said washing tank, and wherein the vapor outlet line from said pump leads through a water tank having a vapor release line in which is disposed a separator for removal of droplets.

19. Apparatus according to claim 11, wherein said two-cylinder drier has at its upper end a rinsing-water line and a connection for adding chemicals, such as cleaning agents and the like, to pump water entering through the rinsing line with the chemicals dissolved therein in circulation through the drier for the purpose of decontamination.

20. Apparatus according to claim 11, wherein the cylinder surfaces and the surfaces in the area of the vapors consist of corrosion-resistant steel.

* * * * *